US006549586B2

(12) United States Patent
Gustafsson et al.

(10) Patent No.: US 6,549,586 B2
(45) **Date of Patent: *Apr. 15, 2003**

(54) SYSTEM AND METHOD FOR DUAL MICROPHONE SIGNAL NOISE REDUCTION USING SPECTRAL SUBTRACTION

(75) Inventors: Harald Gustafsson, Lund (SE); Ingvar Claesson, Dalby (SE); Sven Nordholm, Kallinge (SE)

(73) Assignee: Telefonaktiebolaget L M Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 84 days.

(21) Appl. No.: 09/289,065

(22) Filed: Apr. 12, 1999

(65) Prior Publication Data

US 2001/0016020 A1 Aug. 23, 2001

(51) Int. Cl.[7] ................................................ H04B 15/00

(52) U.S. Cl. ........................ 375/285; 375/346; 704/233; 381/71.1; 455/570

(58) Field of Search ................................ 375/254, 285, 375/346, 348, 349; 704/219, 225, 226, 233; 708/404, 405; 381/71.1, 71.11, 71.12, 94.1, 94.3; 455/63, 67.3, 114, 296, 303, 570

(56) References Cited

U.S. PATENT DOCUMENTS

| | | | | |
|---|---|---|---|---|
| 4,630,305 A | | 12/1986 | Borth et al. | |
| 5,319,736 A | | 6/1994 | Hunt | |
| 5,335,312 A | | 8/1994 | Mekata et al. | |
| 5,418,857 A | * | 5/1995 | Eatwell | 381/71 |
| 5,473,701 A | * | 12/1995 | Cezanne et al. | 381/92 |

(List continued on next page.)

FOREIGN PATENT DOCUMENTS

| | | |
|---|---|---|
| DE | 196 50 410 C1 | 5/1998 |
| EP | 0 084 982 A2 | 8/1983 |
| EP | 0729288 A2 | 8/1996 |
| FR | 2 768 547 | 3/1999 |
| JP | 9-284877 | 10/1997 |

OTHER PUBLICATIONS

European Standard Search Report Date of Completion: Jan. 27, 2000; Date of Mailing: Feb. 1, 2000.

(List continued on next page.)

*Primary Examiner*—Young T. Tse
(74) *Attorney, Agent, or Firm*—Burns, Doane, Swecker & Mathis, L.L.P.

(57) ABSTRACT

Speech enhancement is provided in dual microphone noise reduction systems by including spectral subtraction algorithms using linear convolution, causal filtering and/or spectrum dependent exponential averaging of the spectral subtraction gain function. According to exemplary embodiments, when a far-mouth microphone is used in conjunction with a near-mouth microphone, it is possible to handle non-stationary background noise as long as the noise spectrum can continuously be estimated from a single block of input samples. The far-mouth microphone, in addition to picking up the background noise, also picks up the speaker's voice, albeit at a lower level than the near-mouth microphone. To enhance the noise estimate, a spectral subtraction stage is used to suppress the speech in the far-mouth microphone signal. To be able to enhance the noise estimate, a rough speech estimate is formed with another spectral subtraction stage from the near-mouth signal. Finally, a third spectral subtraction function is used to enhance the near-mouth signal by suppressing the background noise using the enhanced background noise estimate.

22 Claims, 6 Drawing Sheets

U.S. PATENT DOCUMENTS

| | | | | | |
|---|---|---|---|---|---|
| 5,475,761 | A | | 12/1995 | Eatwell | |
| 5,539,859 | A | * | 7/1996 | Robbe et al. | 704/233 |
| 5,602,962 | A | | 2/1997 | Kellermann | |
| 5,610,991 | A | | 3/1997 | Janse | |
| 5,668,747 | A | * | 9/1997 | Ohashi | 708/322 |
| 5,680,393 | A | * | 10/1997 | Bourmeyster et al. | 370/286 |
| 5,740,256 | A | * | 4/1998 | Castello Da Costa et al. | 361/94.7 |
| 5,742,927 | A | * | 4/1998 | Crozier et al. | 704/226 |
| 5,839,101 | A | * | 11/1998 | Vahatalo et al. | 704/226 |
| 5,903,819 | A | * | 5/1999 | Romesburg | 455/63 |
| 5,907,624 | A | * | 5/1999 | Takada | 381/94.2 |
| 5,953,381 | A | * | 9/1999 | Tsukahara | 375/346 |
| 5,974,373 | A | * | 10/1999 | Chan et al. | 704/200 |
| 6,175,602 | B1 | | 1/2001 | Gustafsson et al. | |

OTHER PUBLICATIONS

Malpass, M.L. et al., "Speech enhancement using a soft–decision noise suppression filter", IEEE–Transactions on Acoustics, Speech and Signal Processing, vol. ASSP–28, No. 2, pp. 137–145, Apr. 1980.

Boll, S.F., "Suppression of Acoustic Noise in Speech using Spectral Subtraction", IEEE Trans. Acoust. Speech and Sig. Proc., 27:113–120, 1979.

Virag, N., "Speech Enhancement Based on Masking Properties of the Auditory System", IEEE ICASSP. Proc. 796–799 vol. 1, 1995.

Tsoukalas, D. et al., "Speech Enhancement Using Psychoacoustic Criteria", IEEE ICASSP. Proc. 359–362 vol. 2, 1993.

Xie, F. et al., "Speech Enhancement by Spectral Magnitude Estimation –A Unifying Approach", IEEE Speech Communication, 89–104 vol. 19, 1996.

McOlash, S.M. et al., "A Spectral Subtraction Method for Enhancement of Speech Corrupted by Non–white, Non–stationary Noise", IEEE IECON. Proc. 872–877 vol. 2, 1995.

Proakis, J.G. et al., "Digital Signal Processing; Principles, Algorithms, and Applications", Macmillan, Second Ed., 1992.

Oppenheim, A.V. et al., "Discrete–Time Signal Processing", Prentice–Hall, Inter. Ed., 1989.

Martin, Rainer, "Spectral Subtraction Based on Minimum Statistics", Signal Processing VII: Theories and Applications, 1994 European Association for Signal Processing, Holt, Cowan, Grant, Sandham (Eds.), pp. 1182–1185.

* cited by examiner-

SYSTEM AND METHOD FOR DUAL MICROPHONE SIGNAL NOISE REDUCTION USING SPECTRAL SUBTRACTION

RELATED APPLICATIONS

This is related to U.S. Pat. No. 6,175,602 entitled "Signal Noise Reduction by Spectral Subtraction using Linear Convolution and Causal Filtering." This is also related to pending U.S. patent application Ser. No. 09/084,503, filed May 27, 1998 and entitled "Signal Noise Reduction by Spectral Subtraction using Spectrum Dependent Exponential Gain Function Averaging." Each of the above cited patent and application is incorporated herein by reference in its entirety.

FIELD OF THE INVENTION

The present invention relates to communications systems, and more particularly, to methods and apparatus for mitigating the effects of disruptive background noise components in communications signals.

BACKGROUND OF THE INVENTION

Today, technology and consumer demand have produced mobile telephones of diminishing size. As the mobile telephones are produced smaller and smaller, the placement of the microphone during use ends up more and more distant from the speaker's (near-end user's) mouth. This increased distance increases the need for speech enhancement due to disruptive background noise being picked up at the microphone and transmitted to a far-end user. In other words, since the distance between a microphone and a near-end user is larger in the newer smaller mobile telephones, the microphone picks up not only the near-end user's speech, but also any noise which happens to be present at the near-end location. For example, the near-end microphone typically picks up sounds such as surrounding traffic, road and passenger compartment noise, room noise, and the like. The resulting noisy near-end speech can be annoying or even intolerable for the far-end user. It is thus desirable that the background noise be reduced as much as possible, preferably early in the near-end signal processing chain (e.g., before the received near-end microphone signal is supplied to a near-end speech coder).

As a result of interfering background noise, some telephone systems include a noise reduction processor designed to eliminate background noise at the input of a near-end signal processing chain. FIG. 1 is a high-level block diagram of such a system 100. In FIG. 1, a noise reduction processor 110 is positioned at the output of a microphone 120 and at the input of a near-end signal processing path (not shown). In operation, the noise reduction processor 110 receives a noisy speech signal x from the microphone 120 and processes the noisy speech signal x to provide a cleaner, noise-reduced speech signal $S_{NR}$ which is passed through the near-end signal processing chain and ultimately to the far-end user.

One well known method for implementing the noise reduction processor 110 of FIG. 1 is referred to in the art as spectral subtraction. See, for example, S. F. Boll, "Suppression of Acoustic Noise in Speech using Spectral Subtraction", *IEEE Trans. Acoust. Speech and Sig. Proc.,* 27:113–120, 1979, which is incorporated herein by reference in its entirety. Generally, spectral subtraction uses estimates of the noise spectrum and the noisy speech spectrum to form a signal-to-noise ratio (SNR) based gain function which is multiplied by the input spectrum to suppress frequencies having a low SNR. Though spectral subtraction does provide significant noise reduction, it suffers from several well known disadvantages. For example, the spectral subtraction output signal typically contains artifacts known in the art as musical tones. Further, discontinuities between processed signal blocks often lead to diminished speech quality from the far-end user perspective.

Many enhancements to the basic spectral subtraction method have been developed in recent years. See, for example, N. Virage, "Speech Enhancement Based on Masking Properties of the Auditory System," *IEEE ICASSP. Proc.* 796–799 vol. 1, 1995; D. Tsoukalas, M. Paraskevas and J. Mourjopoulos, "Speech Enhancement using Psychoacoustic Criteria," *IEEE ICASSP. Proc.,* 359–362 vol. 2, 1993; F. Xie and D. Van Compernolle, "Speech Enhancement by Spectral Magnitude Estimation—A Unifying Approach," *IEEE Speech Communication,* 89–104 vol. 19, 1996; R. Martin, "Spectral Subtraction Based on Minimum Statistics," *UESIPCO, Proc.,* 1182–1185 vol. 2, 1994; and S. M. McOlash, R. J. Niederjohn and J. A. Heinen, "A Spectral Subtraction Method for Enhancement of Speech Corrupted by Nonwhite, Nonstationary Noise," *IEEE IECON. Proc.,* 872–877 vol. 2, 1995.

More recently, spectral subtraction has been implemented using correct convolution and spectrum dependent exponential gain function averaging. These techniques are described in U.S. Pat. No. 6,175,602, entitled "Signal Noise Reduction by Spectral Subtraction using Linear Convolution and Causal Filtering" and co-pending U.S. patent application Ser. No. 09/084,503, filed May 27, 1998 and entitled "Signal Noise Reduction by Spectral Subtraction using Spectrum Dependent Exponential Gain Function Averaging."

Spectral subtraction uses two spectrum estimates, one being the "disturbed" signal and one being the "disturbing" signal, to form a signal-to-noise ratio (SNR) based gain function. The disturbed spectra is multiplied by the gain function to increase the SNR for this spectra. In single microphone spectral subtraction applications, such as used in conjunction with hands-free telephones, speech is enhanced from the disturbing background noise. The noise is estimated during speech pauses or with the help of a noise model during speech. This implies that the noise must be stationary to have similar properties during the speech or that the model be suitable for the moving background noise. Unfortunately, this is not the case for most background noises in every-day surroundings.

Therefore, there is a need for a noise reduction system which uses the techniques of spectral subtraction and which is suitable for use with most every-day variable background noises.

SUMMARY OF THE INVENTION

The present invention fulfills the above-described and other needs by providing methods and apparatus for performing noise reduction by spectral subtraction in a dual microphone system. According to exemplary embodiments, when a far-mouth microphone is used in conjunction with a near-mouth microphone, it is possible to handle non-stationary background noise as long as the noise spectrum can continuously be estimated from a single block of input samples. The far-mouth microphone, in addition to picking up the background noise, also picks us the speaker's voice, albeit at a lower level than the near-mouth microphone. To enhance the noise estimate, a spectral subtraction stage is used to suppress the speech in the far-mouth microphone signal. To be able to enhance the noise estimate, a rough speech estimate is formed with another spectral subtraction stage from the near-mouth signal. Finally, a third spectral subtraction stage is used to enhance the near-mouth signal by suppressing the background noise using the enhanced background noise estimate.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

To understand the various features and advantages of the present invention, it is useful to first consider a conventional spectral subtraction technique. Generally, spectral subtraction is built upon the assumption that the noise signal and the speech signal in a communications application are random, uncorrelated and added together to form the noisy speech signal. For example, if s(n), w(n) and x(n) are stochastic short-time stationary processes representing speech, noise and noisy speech, respectively, then:

$$x(n)=s(n)+w(n) \tag{1}$$

$$R_x(f)=R_s(f)+R_w(f) \tag{2}$$

where R(f) denotes the power spectral density of a random process.

The noise power spectral density $R_w(f)$ can be estimated during speech pauses (i.e., where x(n)=w(n)). To estimate the power spectral density of the speech, an estimate is formed as:

$$\hat{R}_s(f)=\hat{R}_x(f)-\hat{R}_w(f) \tag{3}$$

The conventional way to estimate the power spectral density is to use a periodogram. For example, if $X_N)(f_u)$ is the N length Fourier transform of x(n) and $W_N(f_u)$ is the corresponding Fourier transform of w(n), then:

$$\hat{R}_x(f_u)=P_{x,N}(f_u)=\frac{1}{N}|X_N(f_u)|^2,\ f_u=\frac{u}{N},\ u=0,\ \dots\ ,N-1 \tag{4}$$

$$\hat{R}_w(f_u)=P_{w,N}(f_u)=\frac{1}{N}|W_N(f_u)|^2,\ f_u=\frac{u}{N},\ u=0,\ \dots\ ,N-1 \tag{5}$$

Equations (3), (4) and (5) can be combined to provide:

$$|S_N(f_u)|^2=|X_N(f_u)|^2-|W_N(f_u)|^2 \tag{6}$$

Alternatively, a more general form is given by:

$$|S_N(f_u)|^a=|X_N(f_u)|^a-|W_N(f_u)|^a \tag{7}$$

where the power spectral density is exchanged for a general form of spectral density.

Since the human ear is not sensitive to phase errors of the speech, the noisy speech phase $\phi_x(f)$ can be used as an approximation to the clean speech phase $\phi_s(f)$:

$$\phi_s(f_u)\approx\phi_x(f_u) \tag{8}$$

A general expression for estimating the clean speech Fourier transform is thus formed as:

$$S_N(f_u)=(|X_N(f_u)|^a-k\cdot|W_N(f_u)|^a)^{\frac{1}{a}}\cdot e^{j\phi_x(f_u)} \tag{9}$$

where a parameter k is introduced to control the amount of noise subtraction.

In order to simplify the notation, a vector form is introduced:

$$X_N=\begin{pmatrix} X_N(f_0) \\ X_N(f_1) \\ \vdots \\ X_N(f_{N-1}) \end{pmatrix} \tag{10}$$

The vectors are computed element by element. For clarity, element by element multiplication of vectors is denoted herein by $\odot$. Thus, equation (9) can be written employing a gain function $G_N$ and using vector notation as:

$$S_N=G_N\odot|X_N|\odot e^{j\phi_x}=G_N\odot X_N \tag{11}$$

where the gain function is given by:

$$G_N=\left(\frac{|X_N|^a-k\cdot|W_N|^a}{|X_N|^a}\right)^{\frac{1}{a}}=\left(1-k\cdot\frac{|W_N|^a}{|X_N|^a}\right)^{\frac{1}{a}} \tag{12}$$

Figure 1:
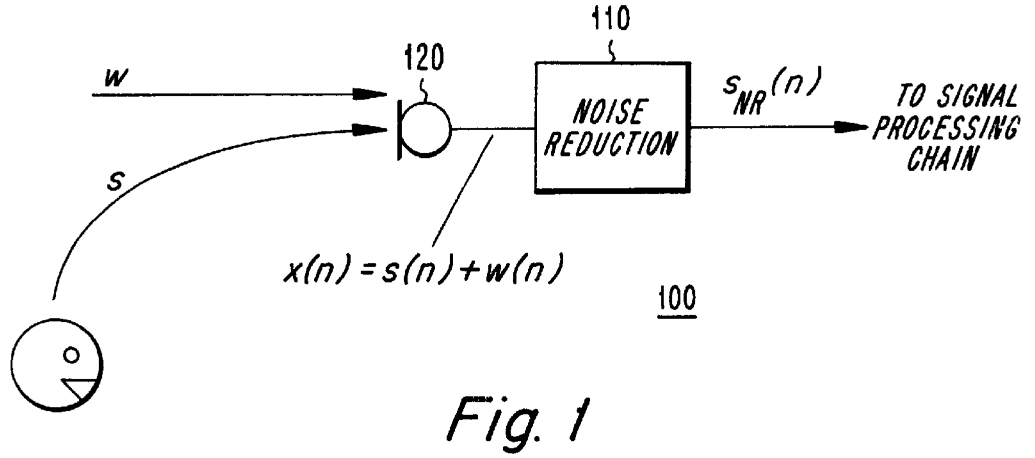
Fig. 1 PRIOR ART
FIG. 1 is a block diagram of a noise reduction system in which spectral subtraction can be implemented.
Figure 2:
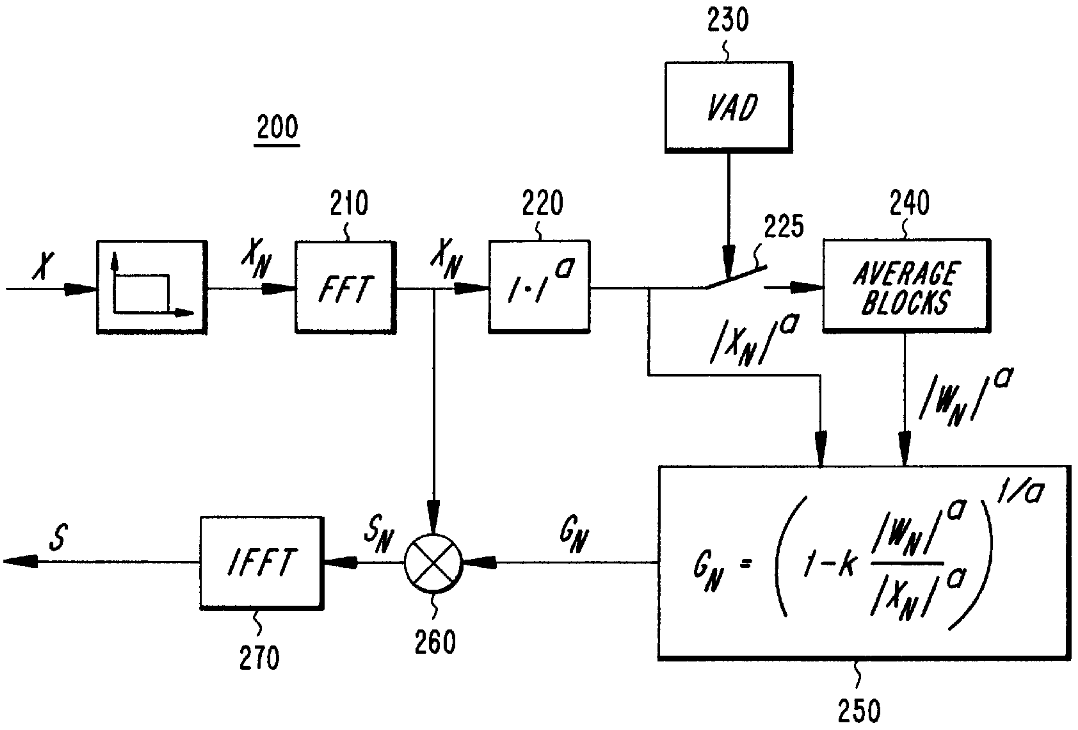
Fig. 2 PRIOR ART
FIG. 2 depicts a conventional spectral subtraction noise reduction processor.

Equation (12) represents the conventional spectral subtraction algorithm and is illustrated in FIG. 2. In FIG. 2, a conventional spectral subtraction noise reduction processor 200 includes a fast Fourier transform processor 210, a magnitude squared processor 220, a voice activity detector 230, a block-wise averaging device 240, a block-wise gain computation processor 250, a multiplier 260 and an inverse fast Fourier transform processor 270.

As shown, a noisy speech input signal is coupled to an input of the fast Fourier transform processor 210, and an output of the fast Fourier transform processor 210 is coupled to an input of the magnitude squared processor 220 and to a first input of the multiplier 260. An output of the magnitude squared processor 220 is coupled to a first contact of the switch 225 and to a first input of the gain computation processor 250. An output of the voice activity detector 230 is coupled to a throw input of the switch 225, and a second contact of the switch 225 is coupled to an input of the block-wise averaging device 240. An output of the block-wise averaging device 240 is coupled to a second input of the gain computation processor 250, and an output of the gain computation processor 250 is coupled to a second input of the multiplier 260. An output of the multiplier 260 is coupled to an input of the inverse fast Fourier transform processor 270, and an output of the inverse fast Fourier transform processor 270 provides an output for the conventional spectral subtraction system 200.

In operation, the conventional spectral subtraction system 200 processes the incoming noisy speech signal, using the conventional spectral subtraction algorithm described above, to provide the cleaner, reduced-noise speech signal. In practice, the various components of FIG. 2 can be implemented using any known digital signal processing technology, including a general purpose computer, a collection of integrated circuits and/or application specific integrated circuitry (ASIC).

Note that in the conventional spectral subtraction algorithm, there are two parameters, a and k, which control the amount of noise subtraction and speech quality. Setting the first parameter to a=2 provides a power spectral subtraction, while setting the first parameter to a=1 provides magnitude spectral subtraction. Additionally, setting the first parameter to a=0.5 yields an increase in the noise reduction while only moderately distorting the speech. This is due to the fact that the spectra are compressed before the noise is subtracted from the noisy speech.

The second parameter k is adjusted so that the desired noise reduction is achieved. For example, if a larger k is chosen, the speech distortion increases. In practice, the parameter k is typically set depending upon how the first parameter a is chosen. A decrease in a typically leads to a decrease in the k parameter as well in order to keep the speech distortion low. In the case of power spectral subtraction, it is common to use over-subtraction (i.e., k>1).

The conventional spectral subtraction gain function (see equation (12)) is derived from a full block estimate and has zero phase. As a result, the corresponding impulse response $g_N(u)$ is non-causal and has length N (equal to the block length). Therefore, the multiplication of the gain function $G_N(l)$ and the input signal $X_N$ (see equation (11)) results in a periodic circular convolution with a non-causal filter. As described above, periodic circular convolution can lead to undesirable aliasing in the time domain, and the non-causal nature of the filter can lead to discontinuities between blocks and thus to inferior speech quality. Advantageously, the present invention a method and apparatus for providing correct convolution with a causal gain filter and thereby eliminates the above described problems of time domain aliasing and inter-block discontinuity.

With respect to the time domain aliasing problem, note that convolution in the time-domain corresponds to multiplication in the frequency-domain. In other words:

$$x(u)*y(u)\leftrightarrows X(f)\cdot Y(f),\ u=-\infty, \ldots, \infty \tag{13}$$

When the transformation is obtained from a fast Fourier transform (FFT) of length N, the result of the multiplication is not a correct convolution. Rather, the result is a circular convolution with a periodicity of N:

$$x_N \hat{N} y_N \tag{14}$$

where the symbol $\hat{N}$ denotes circular convolution.

In order to obtain a correct convolution when using a fast Fourier transform, the accumulated order of the impulse responses $x_N$ and $y_N$ must be less than or equal to one less than the block length N−1.

Thus, the time domain aliasing problem resulting from periodic circular convolution can be solved by using a gain function $G_N(l)$ and an input signal block $X_N$ having a total order less than or equal to N−1.

According to conventional spectral subtraction, the spectrum $X_N$ of the input signal is of full block length N. However, according to the invention, an input signal block $X_L$ of length L (L<N) is used to construct a spectrum of order L. The length L is called the frame length and thus $x_L$ is one frame. Since the spectrum which is multiplied with the gain function of length N should also be of length N, the frame $x_L$ is zero padded to the full block length N, resulting in $X_{L\uparrow N}$.

In order to construct a gain function of length N, the gain function according to the invention can be interpolated from a gain function $G_M(l)$ of length M, where M<N, to form $G_{M\uparrow N}(l)$. To derive the low order gain function $G_{M\uparrow N}(l)$ according to the invention, any known or yet to be developed spectrum estimation technique can be used as an alternative to the above described simple Fourier transform periodogram. Several known spectrum estimation techniques provide lower variance in the resulting gain function. See, for example, J. G. Proakis and D. G. Manolakis, *Digital Signal Processing; Principles, Algorithms, and Applications, Macmillan*, Second Ed., 1992.

According to the well known Bartlett method, for example, the block of length N is divided into K sub-blocks of length M. A periodogram for each sub-block is then computed and the results are averaged to provide an M-long periodogram for the total block as:

$$\begin{aligned} P_{x,M}(f_u) &= \frac{1}{K}\sum_{k=0}^{K-1} P_{x,M,k}(f_u),\ f_u = \frac{u}{M},\ u = 0, \ldots, M-1 \\ &= \frac{1}{K}\sum_{k=0}^{K-1} |\mathcal{F}(x(k\cdot M + u))|^2 \end{aligned} \tag{15}$$

Advantageously, the variance is reduced by a factor K when the sub-blocks are uncorrelated, compared to the full block length periodogram. The frequency resolution is also reduced by the same factor.

Alternatively, the Welch method can be used. The Welch method is similar to the Bartlett method except that each sub-block is windowed by a Hanning window, and the sub-blocks are allowed to overlap each other, resulting in more sub-blocks. The variance provided by the Welch method is further reduced as compared to the Bartlett method. The Bartlett and Welch methods are but two spectral estimation techniques, and other known spectral estimation techniques can be used as well.

Irrespective of the precise spectral estimation technique implemented, it is possible and desirable to decrease the variance of the noise periodogram estimate even further by using averaging techniques. For example, under the assumption that the noise is long-time stationary, it is possible to average the periodograms resulting from the above described Bartlett and Welch methods. One technique employs exponential averaging as:

$$\overline{P}_{x,M}(l)=\alpha\cdot\overline{P}_{x,M}(l-1)+(1-\alpha)\cdot P_{x,M}(l) \tag{16}$$

In equation (16), the function $P_{x,M}(l)$ is computed using the Bartlett or Welch method, the function $\overline{P}_{x,M}(l)$ is the exponential average for the current block and the function $\overline{P}_{x,M}(l-1)$ is the exponential average for the previous block. The parameter α controls how long the exponential memory is, and typically should not exceed the length of how long the noise can be considered stationary. An α closer to 1 results in a longer exponential memory and a substantial reduction of the periodogram variance.

The length M is referred to as the sub-block length, and the resulting low order gain function has an impulse response of length M. Thus, the noise periodogram estimate $\bar{P}_{x_L,M}(l)$ and the noisy speech periodogram estimate $P_{x_L,M}(l)$ employed in the composition of the gain function are also of length M:

$$G_M(l) = \left(1 - k\cdot\frac{\bar{P}^a_{x_L,M}(l)}{P^a_{x_L,M}(l)}\right)^{\frac{1}{a}} \tag{17}$$

According to the invention, this is achieved by using a shorter periodogram estimate from the input frame $X_L$ and averaging using, for example, the Bartlett method. The Bartlett method (or other suitable estimation method) decreases the variance of the estimated periodogram, and there is also a reduction in frequency resolution. The reduction of the resolution from L frequency bins to M bins means that the periodogram estimate $P_{x_L,M}(l)$ is also of length M. Additionally, the variance of the noise periodogram estimate $\bar{P}_{x_L,M}(l)$ can be decreased further using exponential averaging as described above.

To meet the requirement of a total order less than or equal to N−1, the frame length L, added to the sub-block length M, is made less than N. As a result, it is possible to form the desired output block as:

$$S_N = G_{M\uparrow N}(l) \odot X_{L\uparrow N} \tag{18}$$

Advantageously, the low order filter according to the invention also provides an opportunity to address the problems created by the non-causal nature of the gain filter in the conventional spectral subtraction algorithm (i.e., inter-block discontinuity and diminished speech quality). Specifically, according to the invention, a phase can be added to the gain function to provide a causal filter. According to exemplary embodiments, the phase can be constructed from a magnitude function and can be either linear phase or minimum phase as desired.

To construct a linear phase filter according to the invention, first observe that if the block length of the FFT is of length M, then a circular shift in the time-domain is a multiplication with a phase function in the frequency-domain:

$$g(n-l)_M \leftrightarrow G_M(f_u)\cdot e^{-j2\pi ul/M},\; f_u = \frac{u}{M},\; u = 0, \ldots, M-1 \tag{19}$$

In the instant case, I equals M/2+1, since the first position in the impulse response should have zero delay (i.e., a causal filter). Therefore:

$$g(n-(M/2+1))_M \leftrightarrow G_M(f_u)\cdot e^{-j\pi u\left(1+\frac{2}{M}\right)} \tag{20}$$

and the linear phase filter $\bar{G}_M(f_u)$ is thus obtained as $$\bar{G}_M(f_u) = G_M(f_u)\cdot e^{-j\pi u\left(1+\frac{2}{M}\right)} \tag{21}$$

According to the invention, the gain function is also interpolated to a length N, which is done, for example, using a smooth interpolation. The phase that is added to the gain function is changed accordingly, resulting in:

$$\bar{G}_{M\uparrow N}(f_u) = G_{M\uparrow N}(f_u)\cdot e^{-j\pi u\left(1+\frac{2}{M}\right)\frac{M}{N}} \tag{22}$$

Advantageously, construction of the linear phase filter can also be performed in the time-domain. In such case, the gain function $G_M(f_u)$ is transformed to the time-domain using an IFFT, where the circular shift is done. The shifted impulse response is zero-padded to a length N, and then transformed back using an N-long FFT. This leads to an interpolated causal linear phase filter $\bar{G}_{M\uparrow N}(f_u)$ as desired.

A causal minimum phase filter according to the invention can be constructed from the gain function by employing a Hilbert transform relation. See, for example, A.V. Oppenheim and R. W. Schafer, *Discrete-Time Signal Processing, Prentic-Hall*, Inter. Ed., 1989. The Hilbert transform relation implies a unique relationship between real and imaginary parts of a complex function. Advantageously, this can also be utilized for a relationship between magnitude and phase, when the logarithm of the complex signal is used, as:

$$\begin{aligned}\ln(|G_M(f_u)|\cdot e^{j\cdot\arg(G_M(f_u))}) &= \ln(|G_M(f_u)|) + \ln(e^{j\cdot\arg(G_M(f_u))}) \\ &= \ln(|G_M(f_u)|) + j\cdot\arg(G_M(f_u))\end{aligned} \tag{23}$$

In the present context, the phase is zero, resulting in a real function. The function $\ln(|G_M(f_u)|)$ is transformed to the time-domain employing an IFFT of length M, forming $g_M(n)$. The time-domain function is rearranged as:

$$\bar{g}_M(n) = \begin{cases} 2\cdot g_M(n), & n = 1, 2, \ldots, M/2-1 \\ g_M(n), & n = 0, M/2 \\ 0, & n = M/2+1, \ldots, M-1 \end{cases} \tag{24}$$

The function $\bar{g}_M(n)$ is transformed back to the frequency-domain using an M-long FFT, yielding $\ln(|\bar{G}_M(f_u)|\cdot e^{j\cdot arg(\bar{G}_M F_u)})$. From this, the function $\bar{G}_M(f_u)$ is formed. The causal minimum phase filter $\bar{G}_M(f_u)$ is then interpolated to a length N. The interpolation is made the same way as in the linear phase case described above. The resulting interpolated filter $G_{M\uparrow N}(f_u)$ is causal and has approximately minimum phase.

Figure 3:
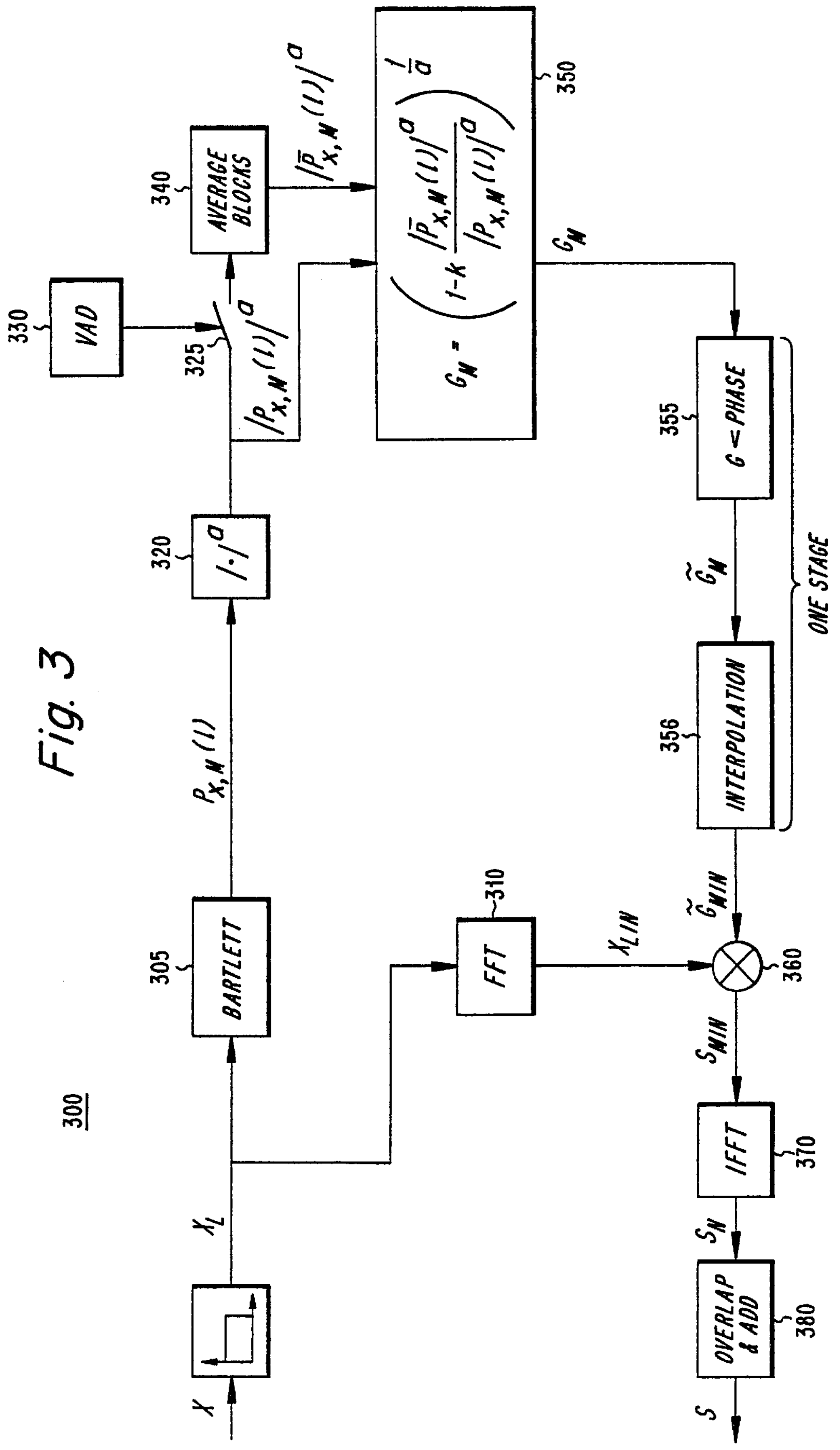
FIGS. 3–4 depict exemplary spectral subtraction noise reduction processors according to exemplary embodiments of the invention.

The above described spectral subtraction scheme according to the invention is depicted in FIG. 3. In FIG. 3, a spectral subtraction noise reduction processor 300, providing linear convolution and causal-filtering, is shown to include a Bartlett processor 305, a magnitude squared processor 320, a voice activity detector 330, a block-wise averaging processor 340, a low order gain computation processor 350, a gain phase processor 355, an interpolation processor 356, a multiplier 360, an inverse fast Fourier transform processor 370 and an overlap and add processor 380.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325 and to a first input of the low order gain computation processor 350. A control output of the voice activity detector 330 is coupled to a throw input of the switch 325, and a second contact of the switch 325 is coupled to an input of the block-wise averaging device 340.

An output of the block-wise averaging device 340 is coupled to a second input of the low order gain computation processor 350, and an output of the low order gain computation processor 350 is coupled to an input of the gain phase processor 355. An output of the gain phase processor 355 is coupled to an input of the interpolation processor 356, and an output of the interpolation processor 356 is coupled to a second input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a reduced noise, clean speech output for the exemplary noise reduction processor 300.

In operation, the spectral subtraction noise reduction processor 300 processes the incoming noisy speech signal, using the linear convolution, causal filtering algorithm described above, to provide the clean, reduced-noise speech signal. In practice, the various components of FIG. 3 can be implemented using any known digital signal processing technology, including a general purpose computer, a collection of integrated circuits and/or application specific integrated circuitry (ASIC).

Advantageously, the variance of the gain function $G_M(l)$ of the invention can be decreased still further by way of a controlled exponential gain function averaging scheme according to the invention. According to exemplary embodiments, the averaging is made dependent upon the discrepancy between the current block spectrum $P_{x,M}(l)$ and the averaged noise spectrum $\overline{P}_{x,M}(l)$. For example, when there is a small discrepancy, long averaging of the gain function $G_M(l)$ can be provided, corresponding to a stationary background noise situation. Conversely, when there is a large discrepancy, short averaging or no averaging of the gain function $G_M(l)$ can be provided, corresponding to situations with speech or highly varying background noise.

In order to handle the transient switch from a speech period to a background noise period, the averaging of the gain function is not increased in direct proportion to decreases in the discrepancy, as doing so introduces an audible shadow voice (since the gain function suited for a speech spectrum would remain for a long period). Instead, the averaging is allowed to increase slowly to provide time for the gain function to adapt to the stationary input.

According to exemplary embodiments, the discrepancy measure between spectra is defined as $$\beta(l) = \frac{\sum_u |P_{x,M,u}(l) - \overline{P}_{x,M,u}(l)|}{\sum_u \overline{P}_{x,M,u}(l)} \tag{25}$$

where $\beta(l)$ is limited by $$\beta(l) \Leftarrow \begin{cases} 1, & \beta(l) > 1 \\ \beta(l), & \beta_{\min} \le \beta(l) \le 1,\ 0 \le \beta_{\min} \ll 1 \\ \beta_{\min}, & \beta(l) < \beta_{\min} \end{cases} \tag{26}$$

and where $\beta(l)=1$ results in no exponential averaging of the gain function, and $\beta(l)=\beta_{min}$ provides the maximum degree of exponential averaging.

The parameter $\overline{\beta}(l)$ is an exponential average of the discrepancy between spectra, described by $$\overline{\beta}(l)=\gamma\cdot\overline{\beta}(l-1)+(1-\gamma)\cdot\beta(l) \tag{27}$$

The parameter $\gamma$ in equation (27) is used to ensure that the gain function adapts to the new level, when a transition from a period with high discrepancy between the spectra to a period with low discrepancy appears. As noted above, this is done to prevent shadow voices. According to the exemplary embodiments, the adaption is finished before the increased exponential averaging of the gain function starts due to the decreased level of $\beta(l)$. Thus:

$$\gamma = \begin{cases} 0, & \overline{\beta}(l-1) < \beta(l) \\ \gamma_c, & \overline{\beta}(l-1) \ge \beta(l),\ 0 < \gamma_c < 1 \end{cases} \tag{28}$$

When the discrepancy $\beta(l)$ increases, the parameter $\overline{\beta}(l)$ follows directly, but when the discrepancy decreases, an exponential average is employed on $\beta(l)$ to form the averaged parameter $\overline{\beta}(l)$. The exponential averaging of the gain function is described by:

$$\overline{G}_M(l)=(1-\overline{\beta}(l))\cdot\overline{G}_M(l-1)+\overline{\beta}(l)\cdot G_M(l) \tag{29}$$

The above equations can be interpreted for different input signal conditions as follows. During noise periods, the variance is reduced. As long as the noise spectra has a steady mean value for each frequency, it can be averaged to decrease the variance. Noise level changes result in a discrepancy between the averaged noise spectrum $\overline{P}_{x,M}(l)$ and the spectrum for the current block $P_{x,M}(l)$. Thus, the controlled exponential averaging method decreases the gain function averaging until the noise level has stabilized at a new level. This behavior enables handling of the noise level changes and gives a decrease in variance during stationary noise periods and prompt response to noise changes. High energy speech often has time-varying spectral peaks. When the spectral peaks from different blocks are averaged, their spectral estimate contains an average of these peaks and thus looks like a broader spectrum, which results in reduced speech quality. Thus, the exponential averaging is kept at a minimum during high energy speech periods. Since the discrepancy between the average noise spectrum $\overline{P}_{x,M}(l)$ and the current high energy speech spectrum $P_{x,M}(l)$ is large, no exponential averaging of the gain function is performed. During lower energy speech periods, the exponential averaging is used with a short memory depending on the discrepancy between the current low-energy speech spectrum and the averaged noise spectrum. The variance reduction is consequently lower for low-energy speech than during background noise periods, and larger compared to high energy speech periods.

Figure 4:
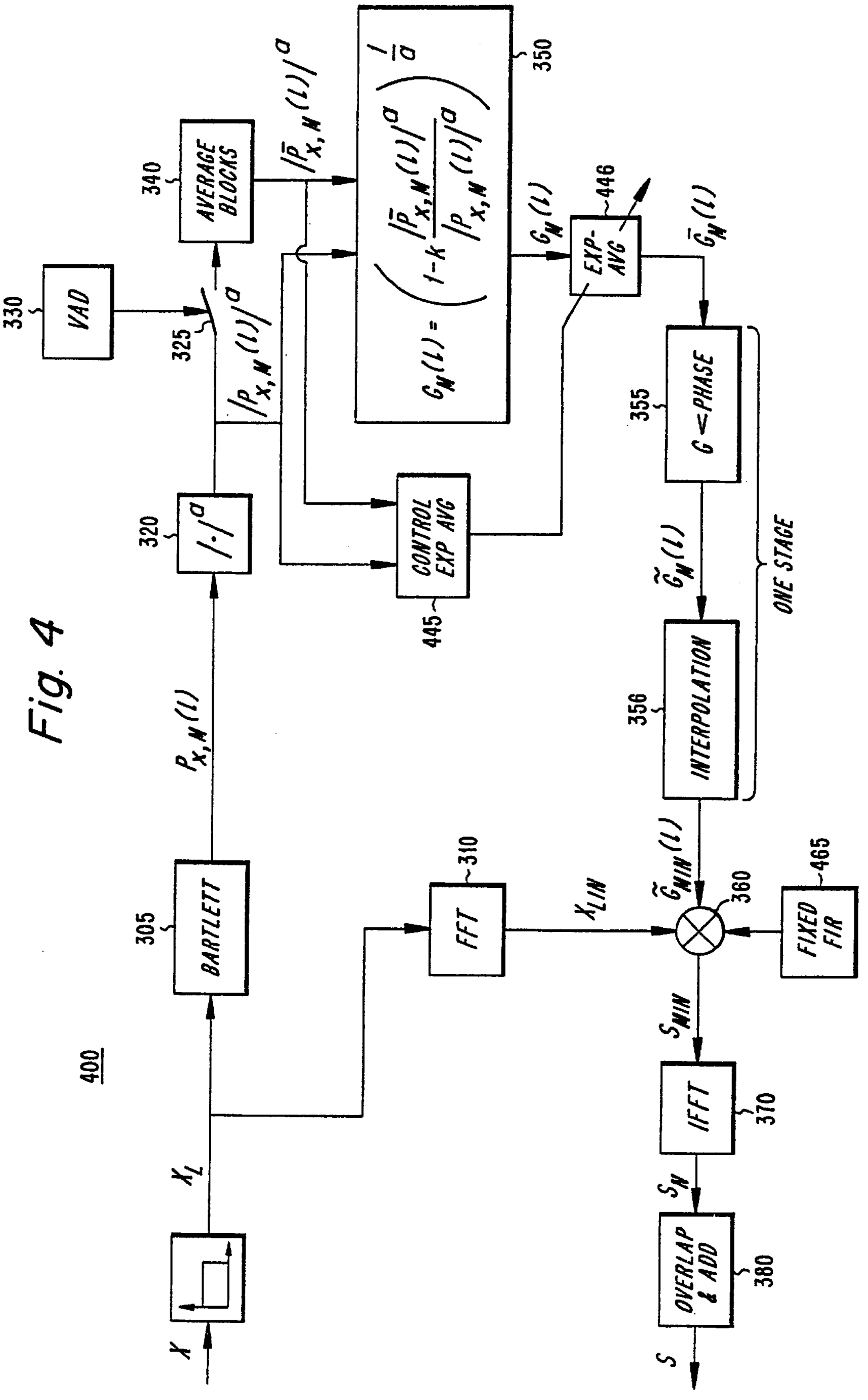

The above described spectral subtraction scheme according to the invention is depicted in FIG. 4. In FIG. 4, a spectral subtraction noise reduction processor 400, providing linear convolution, causal-filtering and controlled exponential averaging, is shown to include the Bartlett processor 305, the magnitude squared processor 320, the voice activity detector 330, the block-wise averaging device 340, the low order gain computation processor 350, the gain phase processor 355, the interpolation processor 356, the multiplier 360, the inverse fast Fourier transform processor 370 and the overlap and add processor 380 of the system 300 of FIG. 3, as well as an averaging control processor 445, an exponential averaging processor 446 and an optional fixed FIR post filter 465.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325, to a first input of the low order gain computation processor 350 and to a first input of the averaging control processor 445.

A control output of the voice activity detector 330 is coupled to a throw input of the switch 325, and a second contact of the switch 325 is coupled to an input of the block-wise averaging device 340. An output of the block-wise averaging device 340 is coupled to a second input of the low order gain computation processor 350 and to a second input of the averaging controller 445. An output of the low order gain computation processor 350 is coupled to a signal input of the exponential averaging processor 446, and an output of the averaging controller 445 is coupled to a control input of the exponential averaging processor 446.

An output of the exponential averaging processor 446 is coupled to an input of the gain phase processor 355, and an output of the gain phase processor 355 is coupled to an input of the interpolation processor 356. An output of the interpolation processor 356 is coupled to a second input of the multiplier 360, and an output of the optional fixed FIR post filter 465 is coupled to a third input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a clean speech signal for the exemplary system 400.

In operation, the spectral subtraction noise reduction processor 400 according to the invention processes the incoming noisy speech signal, using the linear convolution, causal filtering and controlled exponential averaging algorithm described above, to provide the improved, reduced-noise speech signal. As with the embodiment of FIG. 3, the various components of FIG. 4 can be implemented using any known digital signal processing technology, including a general purpose computer, a collection of integrated circuits and/or application specific integrated circuitry (ASIC).

Note that since the sum of the frame length L and the sub-block length M are chosen, according to exemplary embodiments, to be shorter than N-i, the extra fixed FIR filter 465 of length $J \leqq N-1-L-M$ can be added as shown in FIG. 4. The post filter 465 is applied by multiplying the interpolated impulse response of the filter with the signal spectrum as shown. The interpolation to a length N is performed by zero padding of the filter and employing an N-long FFT. This post filter 465 can be used to filter out the telephone bandwidth or a constant tonal component. Alternatively, the functionality of the post filter 465 can be included directly within the gain function.

The parameters of the above described algorithm are set in practice based upon the particular application in which the algorithm is implemented. By way of example, parameter selection is described hereinafter in the context of a GSM mobile telephone.

First, based on the GSM specification, the frame length L is set to 160 samples, which provides 20 ms frames. Other choices of L can be used in other systems. However, it should be noted that an increment in the frame length L corresponds to an increment in delay. The sub-block length M (e.g., the periodogram length for the Bartlett processor) is made small to provide increased variance reduction M. Since an FFT is used to compute the periodograms, the length M can be set conveniently to a power of two. The frequency resolution is then determined as:

$$B = \frac{F_s}{M} \tag{30}$$

The GSM system sample rate is 8000 Hz. Thus a length M=16, M=32 and M=64 gives a frequency resolution of 500 Hz, 250 Hz and 125 Hz, respectively.

Figure 5:
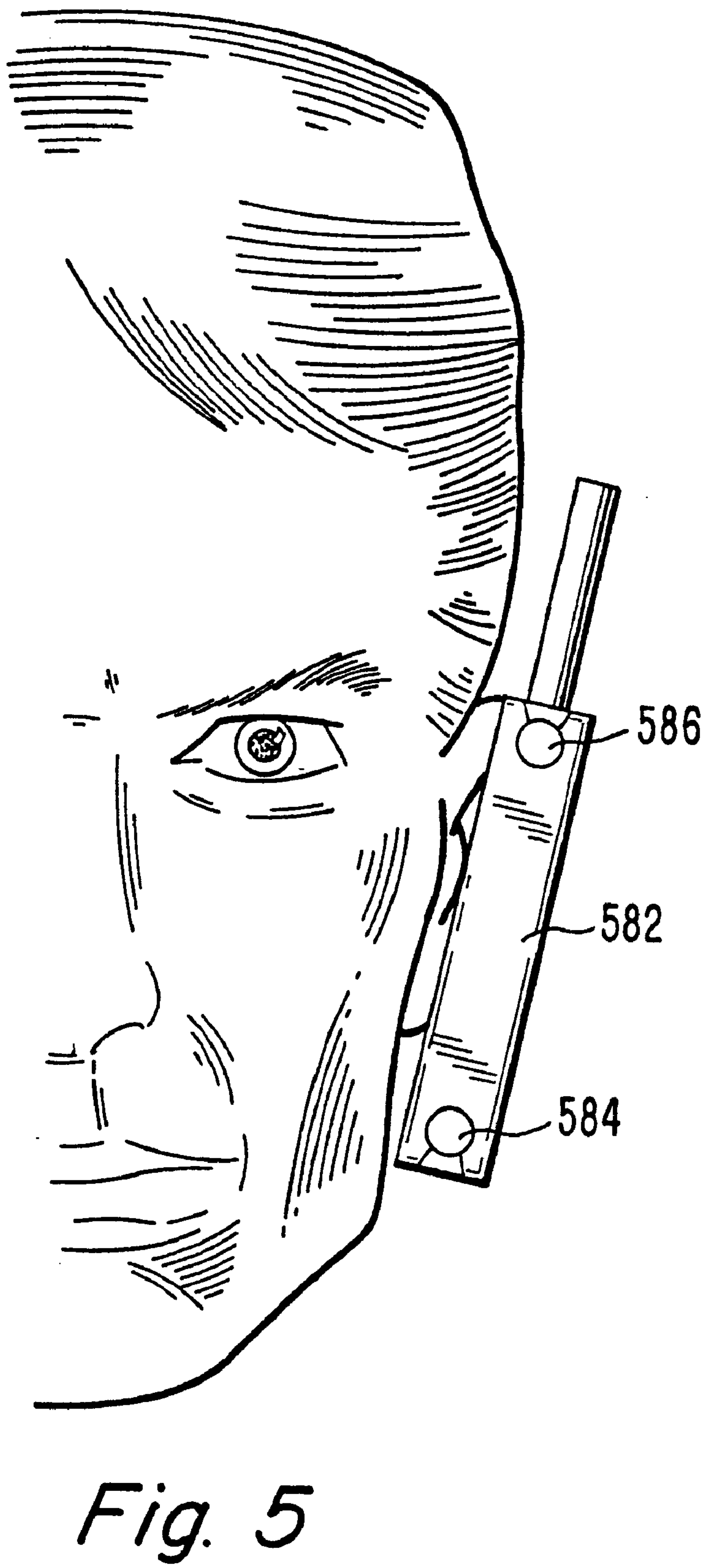
FIG. 5 depicts the placement of near- and far-mouth microphones in an exemplary embodiment of the present invention.

In order to use the above techniques of spectral subtraction in a system where the noise is variable, such as in a mobile telephone, the present invention utilizes a two microphone system. The two microphone system is illustrated in FIG. 5, where 582 is a mobile telephone, 584 is a near-mouth microphone, and 586 is a far-mouth microphone. When a far-mouth microphone is used in conjunction with a near-mouth microphone, it is possible to handle non-stationary background noise as long as the noise spectrum can continuously be estimated from a single block of input samples.

The far-mouth microphone 586, in addition to picking up the background noise, also picks us the speaker's voice, albeit at a lower level than the near-mouth microphone 584. To enhance the noise estimate, a spectral subtraction stage is used to suppress the speech in the far-mouth microphone 586 signal. To be able to enhance the noise estimate, a rough speech estimate is formed with another spectral subtraction stage from the near-mouth signal. Finally, a third spectral subtraction stage is used to enhance the near-mouth signal by filtering out the enhanced background noise.

A potential problem with the above technique is the need to make low variance estimates of the filter, i.e., the gain function, since the speech and noise estimates can only be formed from a short block of data samples. In order to reduce the variability of the gain function, the single microphone spectral subtraction algorithm discussed above is used. By doing so, this method reduces the variability of the gain function by using Bartlett's spectrum estimation method to reduce the variance. The frequency resolution is also reduced by this method but this property is used to make a causal true linear convolution. In an exemplary embodiment of the present invention, the variability of the gain function is further reduced by adaptive averaging, controlled by a discrepancy measure between the noise and noisy speech spectrum estimates.

Figure 6:
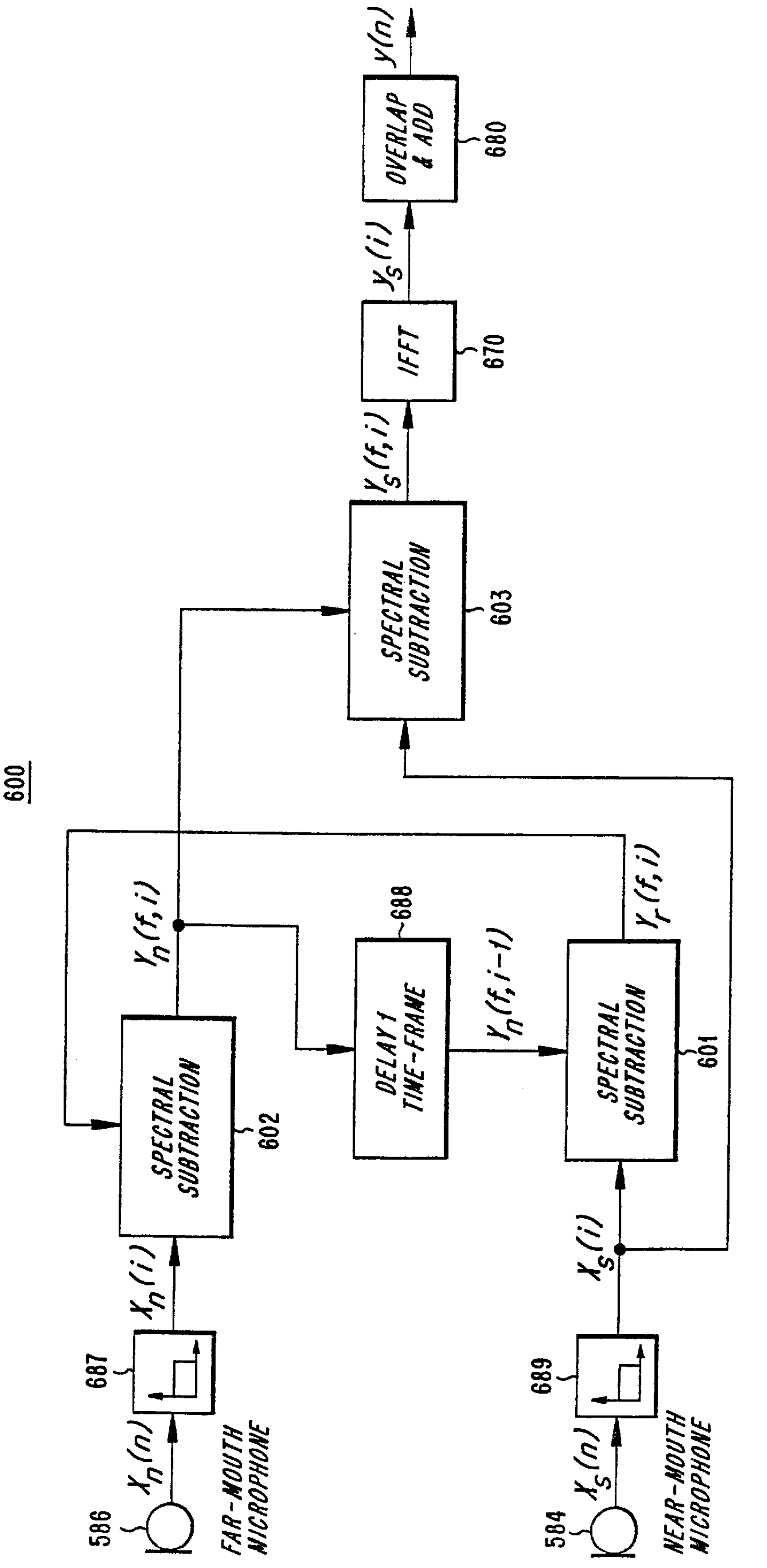
FIG. 6 depicts an exemplary dual microphone spectral subtraction system.

In the two microphone system of the present invention, as illustrated in FIG. 6, there are two signals: the continues signal from the near-mouth microphone 584, where the speech is dominating, $x_s(n)$; and the continuous signal from the far-mouth microphone 586, where the noise is more dominant, $x_n(n)$. The signal from the near-mouth microphone 584 is provided to an input of a buffer 689 where it is broken down into blocks $x_s(i)$. In an exemplary embodiment of the present invention, buffer 689 is also a speech encoder. The signal from the far-mouth microphone 586 is provided to an input of a buffer 687 where it is broken down into blocks $x_n(i)$. Both buffers 687 and 689 can also include additional signal processing such as an echo canceller in order to further enhance the performance of the present invention. An analog to digital (A/D) converter (not shown) converts an analog signal, derived from the microphones 584, 586, to a digital signal so that it may be processed by the spectral subtraction stages of the present invention. The A/D converter may be present either prior to or following the buffers 687, 689.

The first spectral subtraction stage 601 has as its input, a block of the near-mouth signal, $x_s(i)$, and an estimate of the noise from the previous frame, $Y_n(f,i-1)$. The estimate of noise from the previous frame is produced by coupling the output of the second spectral subtraction stage 602 to the input of a delay circuit 688. The output of the delay circuit 688 is coupled to the first spectral subtraction stage 601. This first spectral subtraction stage is used to make a rough estimate of the speech, $Y_r(f,i)$. The output of the first spectral subtraction stage 601 is supplied to the second spectral subtraction stage 602 which uses this estimate ($Y_r(f,i)$) and a block of the far-mouth signal, $x_n(i)$ to estimate the noise spectrum for the current frame, $Y_n(f,i)$. Finally, the output of the second spectral subtraction stage 602 is supplied to the third spectral subtraction stage 603 which uses the current noise spectrum estimate, $Y_n(f,i)$, and a block of the near-mouth signal, $x_s(i)$, to estimate the noise reduced speech, $Y_s(f,i)$. The output of the third spectral subtraction stage 603 is coupled to an input of the inverse fast Fourier transform processor 670, and an output of the inverse fast Fourier transform processor 670 is coupled to an input of the overlap and add processor 680. The output of the overlap and add processor 680 provides a clean speech signal as an output from the exemplary system 600.

In an exemplary embodiment of the present invention, each spectral subtraction stage 601–603 has a parameter which controls the size of the subtraction. This parameter is preferably set differently depending on the input SNR of the microphones and the method of noise reduction being employed. In addition, in a further exemplary embodiment of the present invention, a controller is used to dynamically set the parameters for each of the spectral subtraction stages 601–603 for further accuracy in a variable noisy environment. In addition, since the far-mouth microphone signal is used to estimate the noise spectrum which will be subtracted from the near-mouth noisy speech spectrum, performance of the present invention will be increased when the background noise spectrum has the same characteristics in both microphones. That is, for example, when using a directional near-mouth microphone, the background characteristics are different when compared to an omnidirectional far-mouth microphone. To compensate for the differences in this case, one or both of the microphone signals should be filtered in order to reduce the differences of the spectra.

In an exemplary embodiment of the present invention, it is desirable to keep the delay as low as possible in telephone communications to prevent disturbing echoes and unnatural pauses. When the signal block length is matched with the mobile telephone system's voice encoder block length, the present invention uses the same block of samples as the voice encoder. Thereby, no extra delay is introduced for the buffering of the signal block. The introduced delay is therefore only the computation time of the noise reduction of the present invention plus the group delay of the gain function filtering in the last spectral subtraction stage. As illustrated in the third stage, a minimum phase can be imposed on the amplitude gain function which gives a short delay under the constraint of causal filtering.

Since the present invention uses two microphones, it is no longer necessary to use VAD 330, switch 325, and average block 340 as illustrated with respect to the single microphone use of the spectral subtraction in FIGS. 3 and 4. That is, the far-mouth microphone can be used to provide a constant noise signal during both voice and non-voice time periods. In addition, IFFT 370 and the overlap and add circuit 380 have been moved to the final output stage as illustrated as 670 and 680 in FIG. 6.

Figure 7:
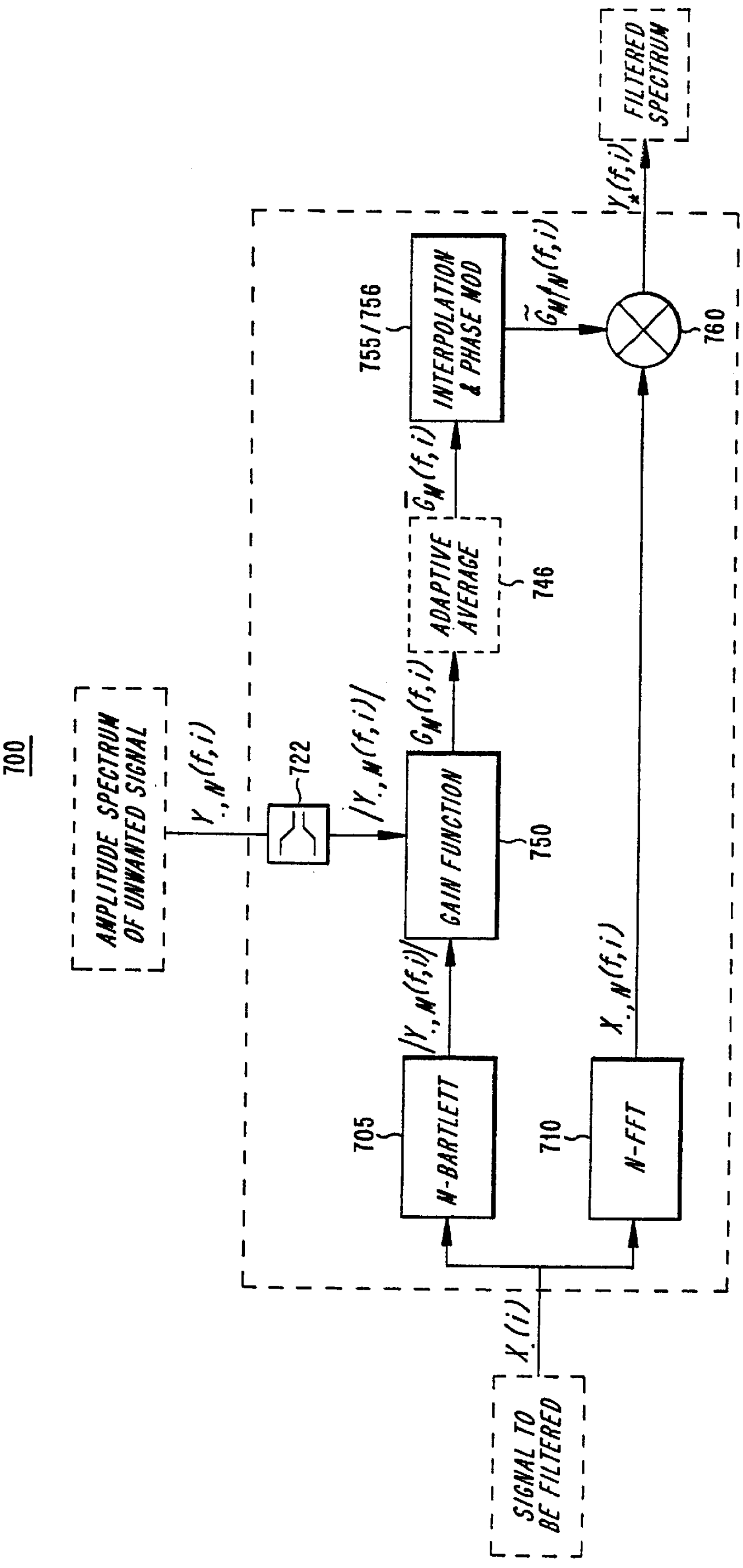
FIG. 7 depicts an exemplary spectral subtraction stage for use in an exemplary embodiment of the present invention.

The above described spectral subtraction stages used in the dual microphone implementation may each be implemented as depicted in FIG. 7. In FIG. 7, a spectral subtraction stage 700, providing linear convolution, causal-filtering and controlled exponential averaging, is shown to include the Bartlett processor 705, the frequency decimator 722, the low order gain computation processor 750, the gain phase processor and the interpolation processor 755/756, and the multiplier 760.

As shown, the noisy speech input signal, $X_{(\cdot)}(i)$, is coupled to an input of the Bartlett processor 705 and to an input of the fast Fourier transform processor 710. The notation $X_{(\cdot)}(i)$ is used to represent $X_n(i)$ or $X_s(i)$ which are provided to the inputs of spectral subtraction stages 601–603 as illustrated in FIG. 6. The amplitude spectrum of the unwanted signal, $Y_{(\cdot,N)}(f,i)$, $Y_{(\cdot)}(f,i)$ with length N, is coupled to an input of the frequency decimator 722. The notation $Y_{(\cdot)}(f,i)$ is used to represent $Y_n(f,i-1)$, $Y_r(f,i)$ or $Y_n(f,i)$. An output of the frequency decimator 722 is the amplitude spectrum of $Y_{(\cdot,N)}(f,i)$ having length M, where M<N. In addition the frequency decimator 722 reduces the variance of the output amplitude spectrum as compared to the input amplitude spectrum. An amplitude spectrum output of the Bartlett processor 705 and an amplitude spectrum output of the frequency decimator 722 are coupled to inputs of the low order gain computation processor 750. The output of the fast Fourier transform processor 710 is coupled to a first input of the multiplier 760.

The output of the low order gain computation processor 750 is coupled to a signal input of an optional exponential averaging processor 746. An output of the exponential averaging processor 746 is coupled to an input of the gain phase and interpolation processor 755/756. An output of processor 755/756 is coupled to a second input of the multiplier 760. The filtered spectrum $Y^*(f,i)$ is thus the output of the multiplier 760, where the notation $Y^*(f,i)$ is used to represent $Y_r(f,i)$, $Y_n(f,i)$, or $Y_s(f,i)$. The gain function used in FIG. 7 is:

$$G_M(f,i) = \left(1 - k_{(\cdot)} \cdot \frac{|Y_{(\cdot),M}(f,i)|^a}{|X_{(\cdot),M}(f,i)|^a}\right)^{\frac{1}{a}} \tag{31}$$

where $|X_{(\cdot),M}(f,i)|$ is the output of Bartlett processor 705, $|Y_{(\cdot),M}(f,i)|$ is the output of the frequency decimator 722, a is a spectrum exponent, $k_{(\cdot)}$ is the subtraction factor controlling the amount of suppression employed for a particular spectral subtraction stage. The gain function can be optionally adaptively averaged. This gain function corresponds to a non-causal time-variating filter. One way to obtain a causal filter is to impose a minimum phase. An alternate way of obtaining a causal filter is to impose a linear phase. To obtain a gain function $G_M(f,i)$ with the same number of FFT bins as the input block $X_{(\cdot),N}(f,i)$, the gain function is interpolated, $G_{M\uparrow N}(f,i)$. The gain function, $G_{M\uparrow N}(\uparrow,i)$, now corresponds to a causal linear filter with length M. By using conventional FFT filtering, an output signal without periodicity effects can be obtained.

In operation, the spectral subtraction stage 700 according to the invention processes the incoming noisy speech signal, using the linear convolution, causal filtering and controlled exponential averaging algorithm described above, to provide the improved, reduced-noise speech signal. As with the embodiment of FIGS. 3 and 4, the various components of FIGS. 7–8 can be implemented using any known digital signal processing technology, including a general purpose computer, a collection of integrated circuits and/or application specific integrated circuitry (ASIC).

In summary, the present invention provides improved methods and apparatus for dual microphone spectral subtraction using linear convolution, causal filtering and/or controlled exponential averaging of the gain function. One skilled in the art will readily recognize that the present invention can enhance the quality of any audio signal such as music, etc., and is not limited to only voice or speech audio signals. The exemplary methods handle non-stationary background noises, since the present invention does not rely on measuring the noise on only noise-only periods. In addition, during short duration stationary background noises, the speech quality is also improved since background noise can be estimated during both noise-only and speech periods. Furthermore, the present invention can be used with or without directional microphones, and each microphone can be of a different type. In addition, the magnitude of the noise reduction can be adjusted to an appropriate level to adjust for a particular desired speech quality.

Those skilled in the art will appreciate that the present invention is not limited to the specific exemplary embodiments which have been described herein for purposes of illustration and that numerous alternative embodiments are also contemplated. For example, though the invention has been described in the context of mobile communications applications, those skilled in the art will appreciate that the teachings of the invention are equally applicable in any signal processing application in which it is desirable to remove a particular signal component. The scope of the invention is therefore defined by the claims which are appended hereto, rather than the foregoing description, and all equivalents which are consistent with the meaning of the claims are intended to be embraced therein.

We claim:

1. A noise reduction system, comprising:

a first subtraction processor configured to filter a first signal to provide a frequency spectral noise reduced output signal;

a second subtraction processor configured to filter a second signal to provide a frequency spectral noise estimate output signal; and a third subtraction processor configured to filter said first signal as a function of said frequency spectral noise estimate output signal.

2. The system of claim 1, wherein said second subtraction processor is configured to filter said second signal as a function of said frequency spectral noise reduced output signal.

3. The system of claim 1, wherein said system further comprises:

a delay circuit, wherein said frequency spectral noise estimate output signal is coupled to an input of said delay circuit; and wherein said first subtraction processor is configured to filter said first signal as a function of an output of said delay circuit.

4. The system of claim 1, wherein said system further comprises:

a first microphone; and a second microphone, wherein said first signal is derived from an output of said first microphone and said second signal is derived from an output of said second microphone.

5. The system of claim 4, wherein said first microphone is of a different type than said second microphone.

6. The system of claim 4, wherein said first microphone is closer to a source of a desired audio wave than said second microphone.

7. The system of claim 1, wherein a gain function of at least one of said first, second, and third subtraction processors is computed based on an estimate of a spectral density of an input signal and on an estimate of a spectral density of an undesired component of said input signal, wherein a block of samples of an output signal of said at least one of said first, second, and third subtraction processors is computed based on a respective block of samples of said input signal and on a respective block of samples of the gain function, and wherein a sum of an order of the respective block of samples of said input signal and of an order of the respective block of samples of the gain function is less than the number of samples of the blocks of the output signal.

8. The system of claim 7, wherein a phase is added to the gain function so that at least one of said first, second, and third subtraction processors provides causal filtering.

9. The system of claim 8, wherein the gain function has linear phase.

10. The system of claim 8, wherein the gain function has minimum phase.

11. A method for processing a noisy input signal and a noise signal to provide a frequency spectral noise reduced output signal, comprising the steps of:

(a) using a first subtraction to filter said noisy input signal to provide said frequency spectral noise reduced output signal;

(b) using a second subtraction to filter said noise signal to provide a frequency spectral noise estimate output signal; and (c) using a third subtraction to filter said noisy input signal as a function of said frequency spectral noise estimate output signal.

12. The method of claim 11, wherein step (b) filters said noise signal based on said frequency spectral noise reduced output signal.

13. The method of claim 11, wherein said method further comprises the steps of:

(d) delaying said frequency spectral noise estimate output signal; and wherein step (a) further includes using said first subtraction to filter said noisy input signal as a function of a result of step (d) to provide said frequency spectral noise reduced output signal.

14. The method of claim 11, wherein a gain function of at least one of said first, second, and third subtractions is computed based on an estimate of a spectral density of an input signal and on an estimate of a spectral density of an undesired component of said input signal, wherein a block of samples of an output signal of said at least one of said first, second, and third subtractions is computed based on a respective block of samples of said input signal and on a respective block of samples of the gain function, and wherein a sum of an order of the respective block of samples of said input signal and of an order of the respective block of samples of the gain function is less than the number of samples of the blocks of the output signal.

15. The method of claim 14, wherein a phase is added to the gain function so that at least one of said first, second, and third subtractions provides causal filtering.

16. The method of claim 15, wherein the gain function has linear phase.

17. The method of claim 15, wherein the gain function has minimum phase.

18. A mobile telephone, comprising:

an input for receiving a first signal derived from a first microphone;

an input for receiving a second signal derived from a second microphone;

a first subtraction processor configured to filter said first signal to provide a frequency spectral noise reduced output signal;

a second subtraction processor configured to filter said second signal to provide a frequency spectral noise estimate output signal; and a third subtraction processor configured to filter said first signal as a function of said frequency spectral noise estimate output signal.

19. The mobile telephone of claim 18, wherein said second subtraction processor is configured to filter said second signal as a function of said frequency spectral noise reduced output signal.

20. The mobile telephone of claim 18, wherein said mobile telephone further comprises:

a delay circuit, wherein said frequency spectral noise estimate output signal is coupled to an input of said delay circuit; and wherein said first subtraction processor is configured to filter said first signal as a function of an output of said delay circuit.

21. The mobile telephone of claim 18, wherein said first microphone is of a different type than said second microphone.

22. The mobile telephone of claim 18, wherein said first microphone is closer to a source of an audio wave than said second microphone.

* * * * *